United States Patent
Du et al.

(10) Patent No.: US 11,245,255 B2
(45) Date of Patent: Feb. 8, 2022

(54) SOLID-STATE CIRCUIT BREAKER AND BREAKING METHOD FOR SOLID-STATE CIRCUIT BREAKER

(71) Applicants: Siemens Aktiengesellschaft, Munich (DE); Feng Du, Shanghai (CN); Wei Gang Chen, Shanghai (CN); Yue Zhuo, Beijing (CN)

(72) Inventors: Feng Du, Shanghai (CN); Wei Gang Chen, Shanghai (CN); Yue Zhuo, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/973,098

(22) PCT Filed: Jun. 11, 2018

(86) PCT No.: PCT/CN2018/090576
§ 371 (c)(1),
(2) Date: Dec. 8, 2020

(87) PCT Pub. No.: WO2019/237221
PCT Pub. Date: Dec. 19, 2019

(65) Prior Publication Data
US 2021/0257832 A1   Aug. 19, 2021

(51) Int. Cl.
*H02H 9/02* (2006.01)
*H02H 3/08* (2006.01)
(Continued)

(52) U.S. Cl.
CPC ............. *H02H 9/025* (2013.01); *H02H 3/08* (2013.01); *H02H 9/02* (2013.01); *H02H 9/021* (2013.01);
(Continued)

(58) Field of Classification Search
CPC .......... H02H 9/02; H02H 9/025; H02H 9/021; H02H 1/0092; H02H 1/0007; H02H 1/00;
(Continued)

(56) References Cited

U.S. PATENT DOCUMENTS

| 8,729,739 | B2 | 5/2014 | Lubomirsky |
| 2013/0070492 | A1* | 3/2013 | Skarby ..................... H02H 3/00 363/51 |
| 2015/0022928 | A1* | 1/2015 | Mohaddes Khorassani ................ H02H 1/0007 361/93.7 |

FOREIGN PATENT DOCUMENTS

CN   107834526 A   3/2018

OTHER PUBLICATIONS

International Search Report PCT/ISA/210 for International Application No. PCT/CN/2018/090576 dated Mar. 14, 2019.
(Continued)

*Primary Examiner* — Danny Nguyen
(74) *Attorney, Agent, or Firm* — Harness, Dickey & Pierce, P.L.C.

(57) ABSTRACT

A solid-state circuit breaker and breaking method are disclosed. In an embodiment, the solid-state circuit breaker includes a semiconductor switch; a controller, connected to the semiconductor switch; and an energy absorber, connected in parallel with the semiconductor switch. The controller is configured to obtain an equivalent inductance of a circuit of the solid-state circuit breaker upon a fault occurring in a line. Further, upon the equivalent inductance being greater than an inductance estimated value, the controller is configured to set a second current fault threshold. Finally, upon a fault current of the line reaching the second current fault threshold, the semiconductor switch is controlled to execute a closing operation.

14 Claims, 2 Drawing Sheets

(51) Int. Cl.
　　　*H02H 1/00*　　　　(2006.01)
　　　*H02H 3/087*　　　(2006.01)
(52) U.S. Cl.
　　　CPC ......... *H02H 1/0007* (2013.01); *H02H 1/0092* (2013.01); *H02H 3/087* (2013.01); *H02H 9/023* (2013.01)
(58) Field of Classification Search
　　　CPC ............ H02H 3/08; H02H 9/542; H02H 9/54; H02H 9/023; H02H 3/087; H02H 3/00; H01F 38/14
　　　USPC ..................................... 361/2–13, 93.7–93.9
　　　See application file for complete search history.

(56) References Cited

OTHER PUBLICATIONS

Written Opinion PCT/ISA/237 for International Application No. PCT/CN/2018/090576 dated Mar. 14, 2019.

\* cited by examiner

SOLID-STATE CIRCUIT BREAKER AND BREAKING METHOD FOR SOLID-STATE CIRCUIT BREAKER

PRIORITY STATEMENT

This application is the national phase under 35 U.S.C. § 371 of PCT International Application No. PCT/CN2018/090576, which has an International filing date of Jun. 11, 2018, which designated the United States of America, the entire contents of which are hereby incorporated herein by reference.

FIELD

Embodiments of invention generally relate to the field of circuit breakers, and in particular to a solid-state circuit breaker and a breaking method for a solid-state circuit breaker.

BACKGROUND

Solid state circuit breakers (SSCB) are now being used more and more widely. Solid state circuit breakers are composed of semiconductor devices, and have the advantages of fast breaking, long contact life and a degree of intelligence, and therefore have high potential for use in the field of low-voltage protection. However, in fault current interruption application scenarios, one of the main problems is how to protect the SSCB itself. That is, once an operation to execute fault interruption has been triggered, energy stored on a line must be released, so a release path must be provided.

SSCBs have an energy absorber, which provides an energy release path, but this is highly reliant on system inductance. If the inductance is higher than an estimated value, the energy needing to be released is higher than a design value, and the SSCB will be damaged due to surplus energy.

SUMMARY

A first embodiment of the present invention provides a solid-state circuit breaker, comprising: a semiconductor switch; a control unit, connected to the semiconductor switch; an energy absorber, connected in parallel with the semiconductor switch, wherein the control unit obtains an equivalent inductance of a circuit of the solid-state circuit breaker when a fault occurs in a line, and when the equivalent inductance is greater than an inductance estimated value, the control unit sets a second current fault threshold; when a fault current of the line reaches the second current fault threshold, the semiconductor switch is controlled to execute a closing operation.

A second embodiment of the present invention provides a breaking method for a solid-state circuit breaker, wherein the solid-state circuit breaker comprises: a semiconductor switch; a control unit, connected to the semiconductor switch; an energy absorber, connected in parallel with the semiconductor switch, wherein the control unit obtains an equivalent inductance of a circuit of the solid-state circuit breaker when a fault occurs in a line, and when the equivalent inductance is greater than an inductance estimated value, the control unit sets a second current fault threshold; when a fault current of the line reaches the second current fault threshold, the semiconductor switch is controlled to execute a closing operation.

DETAILED DESCRIPTION OF THE EMBODIMENTS

Figure 1:
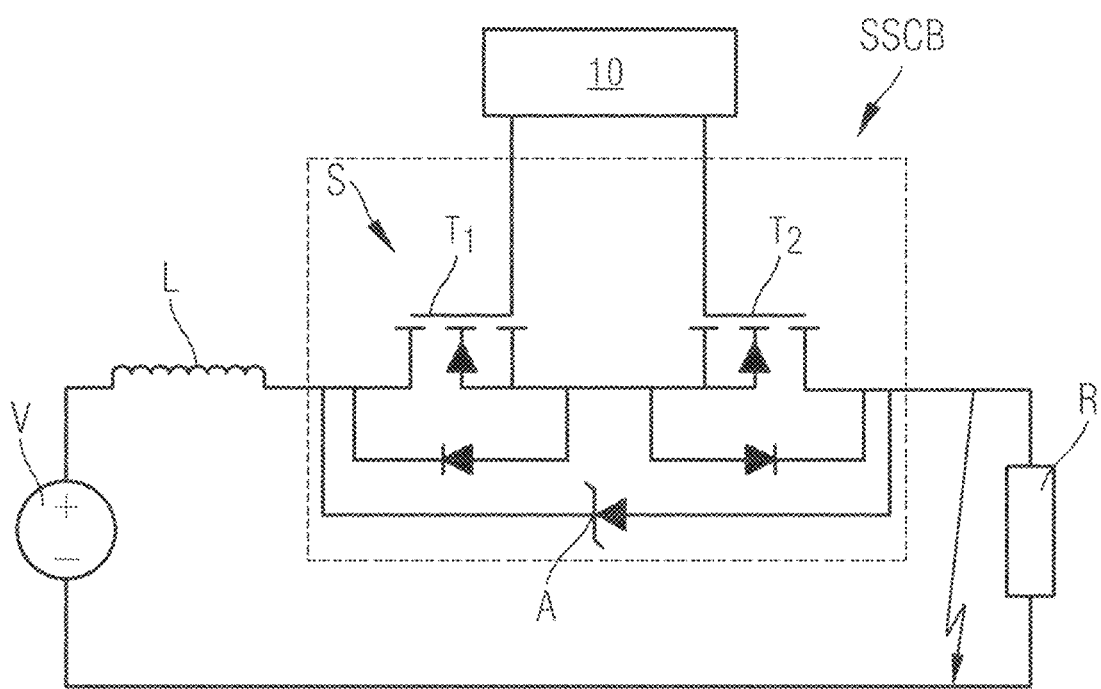
FIG. 1 is an equivalent circuit of a solid-state circuit breaker.

A first embodiment of the present invention provides a solid-state circuit breaker, comprising: a semiconductor switch; a control unit, connected to the semiconductor switch; an energy absorber, connected in parallel with the semiconductor switch, wherein the control unit obtains an equivalent inductance of a circuit of the solid-state circuit breaker when a fault occurs in a line, and when the equivalent inductance is greater than an inductance estimated value, the control unit sets a second current fault threshold; when a fault current of the line reaches the second current fault threshold, the semiconductor switch is controlled to execute a closing operation.

Furthermore, the semiconductor switch is a CMOS switch, comprising a first NMOS transistor and a second NMOS transistor; the sources of the first NMOS transistor and second NMOS transistor are connected together, wherein the control unit is separately connected to the gates of the first NMOS transistor and second NMOS transistor.

Furthermore, the equivalent inductance is:

$$L_{practicalseries} = \frac{V_{bus}}{\left.\frac{di}{dt}\right|_{t=t_0}}$$

wherein $V_{bus}$ is a voltage of the line, i is a measured value of a line current, and t0 is the time point when the fault occurs in the line.

Furthermore, the second current fault threshold is:

$$I_{newthrehold} = \Delta T \times \frac{V_{clamp} - V_{bus}}{L_{practicalseries}}$$

wherein $V_{clamp}$ is a clamping voltage, and $\Delta T$ is a fault disappearance time.

Furthermore, an initial current fault threshold of the line is:

$$I_{oldthrehold} = \frac{V_{clamp} - V_{bus}}{L_{practicalseries}}$$

wherein $I_{newthrehold} < I_{oldthrehold}$.

Furthermore, the energy consumed by the energy absorber (A) is:

$$E_{TVS} = \int_{t_1}^{t_2} P_{TVS}(\tau) d\tau = \frac{1}{2} \times V_{clamp} \times \Delta T$$

wherein $P_{TVS}(\tau)$ is the instantaneous power at time point $\tau$, $$E_{TVS} < \frac{1}{2} \times I_{newthrehold} \times V_{clamp} \times \Delta T.$$

Furthermore, the energy absorber is a transient voltage suppression diode.

A second embodiment of the present invention provides a breaking method for a solid-state circuit breaker, wherein the solid-state circuit breaker comprises: a semiconductor switch; a control unit, connected to the semiconductor switch; an energy absorber, connected in parallel with the semiconductor switch, wherein the control unit obtains an equivalent inductance of a circuit of the solid-state circuit breaker when a fault occurs in a line, and when the equivalent inductance is greater than an inductance estimated value, the control unit sets a second current fault threshold; when a fault current of the line reaches the second current fault threshold, the semiconductor switch is controlled to execute a closing operation.

Furthermore, the semiconductor switch is a CMOS switch, comprising a first NMOS transistor and a second NMOS transistor; the sources of the first NMOS transistor and second NMOS transistor are connected together, wherein the control unit is separately connected to the gates of the first NMOS transistor and second NMOS transistor.

Furthermore, the equivalent inductance is:

$$L_{practicalseries} = \frac{V_{bus}}{\left.\frac{di}{dt}\right|_{t=t_0}}$$

wherein $V_{bus}$ is a voltage of the line, i is a measured value of a line current, and $t_0$ is the time point when the fault occurs in the line.

Furthermore, the second current fault threshold is:

$$I_{newthrehold} = \Delta T \times \frac{V_{clamp} - V_{bus}}{L_{practicalseries}}$$

wherein $V_{clamp}$ is a clamping voltage, and $\Delta T$ is a fault disappearance time.

Furthermore, an initial current fault threshold of the line is:

$$I_{oldthrehold} = \frac{V_{clamp} - V_{bus}}{L_{practicalseries}}$$

wherein $I_{newthrehold} < I_{oldthrehold}$.

Furthermore, the energy consumed by the energy absorber is:

$$E_{TVS} = \int_{t_1}^{t_2} P_{TVS}(\tau)d\tau = \frac{1}{2} \times V_{clamp} \times \Delta T$$

wherein $P_{TVS}(\tau)$ is the instantaneous power at time point $\tau$, wherein $E_{TVS} < \frac{1}{2} \times I_{oldthrehold} \times V_{clamp} \times \Delta T$.

Furthermore, the energy absorber is a transient voltage suppression diode.

At least one embodiment of the present invention can expand the range of applications of the solid-state circuit breaker, and ensure that the solid-state circuit breaker is safe and will not be burned out by a fault current. The energy that the solid-state circuit breaker needs to dissipate is controlled within a safe range through appropriate threshold arrangement. Moreover, the functions of the elements are utilized fully by taking full account of the ambient temperature.

Particular embodiments of the present invention are explained below in conjunction with the drawings.

A first embodiment of the present invention provides a solid-state circuit breaker. FIG. 1 is an equivalent circuit of the solid-state circuit breaker, wherein a semiconductor switch is in particular a CMOS switch S. As shown in FIG. 1, the solid-state circuit breaker SSCB comprises a CMOS switch S, a control unit 10 and an energy absorber A. The CMOS switch S comprises a first NMOS transistor T1 and a second NMOS transistor T2; the sources of the first NMOS transistor T1 and second NMOS transistor T2 are connected together. The control unit 10 is separately connected to the gates of the first NMOS transistor T1 and second NMOS transistor T2. The energy absorber A is connected in parallel with the CMOS switch S.

Specifically, the sources of the first NMOS transistor T1 and second NMOS transistor T2 are connected together. Furthermore, the first NMOS transistor T1 is connected to an inductor L, and the second NMOS transistor T2 is connected to a load resistor R; an AC power supply V is also connected in series between the inductor L and the load resistor R. The energy absorber A is connected in parallel with the CMOS analog switch; specifically, the energy absorber A is connected in parallel between the drain of the first NMOS transistor T1 and the drain of the second NMOS transistor T2.

The control unit 10 is configured to obtain an equivalent inductance of a circuit of the solid-state circuit breaker SSCB when a fault occurs in a line; when the equivalent inductance is greater than an inductance estimated value, the control unit 10 sets a second current fault threshold. Then, when a fault current of the line reaches the second current fault threshold, the control unit 10 controls the CMOS switch (S) to execute a closing operation. The solid-state circuit breaker has an initial fault threshold; by promptly setting the second current fault threshold and controlling the execution of the closing operation when the fault current reaches the second fault threshold, the present invention provides an energy release path through the energy absorber, thus protecting the solid-state circuit breaker.

The equivalent inductance is:

$$L_{practicalseries} = \frac{V_{bus}}{\left.\frac{di}{dt}\right|_{t=t_0}}$$

wherein $V_{bus}$ is a voltage of the line, i is a measured value of a line current, and to is the time point when the fault occurs in the line. If a fault occurs in the line, the present invention can calculate a system inductance $L_{practicalseries}$ by means of the above algorithm.

The second current fault threshold is:

$$I_{newthrehold} = \Delta T \times \frac{V_{clamp} - V_{bus}}{L_{practicalseries}}$$

wherein $V_{clamp}$ is a clamping voltage, and $\Delta T$ is a fault disappearance time.

An initial current fault threshold of the line is:

$$I_{oldthrehold} = \frac{V_{clamp} - V_{bus}}{L_{practicalseries}}$$

wherein $I_{newthrehold} < I_{oldthrehold}$.

At least one embodiment of the present invention can control the energy consumed by the energy absorber A to be less than:

$$E_{TVS} = \int_{t_1}^{t_2} P_{TVS}(\tau)d\tau = \frac{1}{2} \times V_{clamp} \times \Delta T$$

wherein $P_{TVS}(\tau)$ is the instantaneous power at time point $\tau$; it must be explained that if it is the initial fault threshold, the energy consumed by the energy absorber is $E_{TVS} < \frac{1}{2} \times I_{oldthrehold} \times V_{clamp} \times \Delta T$.

In particular, the energy absorber A is a transient voltage suppression (TVS) diode.

Specifically, the control unit 10 at least comprises a comparison block module, used for threshold adjustment. If the actual system inductance value $L_{practicalseries}$ calculated is greater than a system inductance estimated value $L_{estimatedseries}$, then the control unit 10 sets a new fault threshold, i.e. a second fault threshold, wherein the second fault threshold is:

$$I_{newthrehold} = \Delta T \times \frac{V_{clamp} - V_{bus}}{L_{practicalseries}}$$

wherein $V_{clamp}$ is the clamping voltage, and $\Delta T$ is the fault disappearance time. The initial fault threshold of the solid-state circuit breaker is:

$$I_{oldthrehold} = \frac{V_{clamp} - V_{bus}}{L_{practicalseries}}$$

wherein $I_{newthrehold} < I_{oldthrehold}$.

When the fault current reaches the second fault threshold, the semiconductor switch S is closed. Thus, based on the following formula, the energy dissipated by the absorber A is kept within a range that is set as follows:

$$E_{TVS} = \int_{t_1}^{t_2} P_{TVS}(\tau)d\tau = \frac{1}{2} \times V_{clamp} \times \Delta T$$

wherein $P_{TVS}(\tau)$ is the instantaneous power at time point $\tau$, wherein $E_{TVS} < \frac{1}{2} \times I_{oldthrehold} \times V_{clamp} \times \Delta T$.

The above algorithm may be realized using an analog circuit or a controller based on an MCU/DSP/FPGA. Taking into account the derating of the system TVS diode, the threshold setting above may be set in combination with additional ambient temperature information. A wider interference current range can thus be obtained.

An explanation is given below in conjunction with a particular embodiment; the voltage $V_{bus}$ of the line is DC, with $V_{bus}$=270 V. The semiconductor switch S is a silicon carbide (SiC) MOSFET, composed of 5 parallel chips; the maximum rated voltage (maximum device voltage rating) thereof is 1.2 kV, and the rated current thereof is 200 A. A fault current threshold is $I_{threshold}$, an estimated system maximum inductance is $L_{series}$, a required fault disappearance time is $\Delta T$, and a transient peak power/energy $E_{TVS}$ is:

$$E_{TVS} = \int_{t_1}^{t_2} P_{TVS}(\tau)d\tau = \frac{1}{2} \times I_{SSCB}(t_1) \times V_{clamp} \times \Delta T,$$

wherein ISSCB is a current flowing through the solid-state circuit breaker, and $$\Delta T \approx \frac{L_{series} \times \Delta I_{SSCB}}{V_{clamp} - V_{bus}}.$$

Suppose that the fault current threshold $I_{threshold}$=400 A, $V_{clamp}$=1 KV, $L_{series}$=80 uH; thus the transient peak power/energy ETVS designed on the basis of the circuit=8.77 J. If the actual system inductance is 100 uH, then the actual peak power needing to be consumed is 10.99 J, which is greater than 8.77 J; thus, the system has the risk of solid-state circuit breaker destruction. Thus, the fault current threshold is adjusted to 375 A, and the actual peak power will be reduced from 10.99 J to 8.77 J, which is less than the 8.77 J that is actually designed; such a design ensures the reliability and safety of the solid-state circuit breaker.

Figure 2:
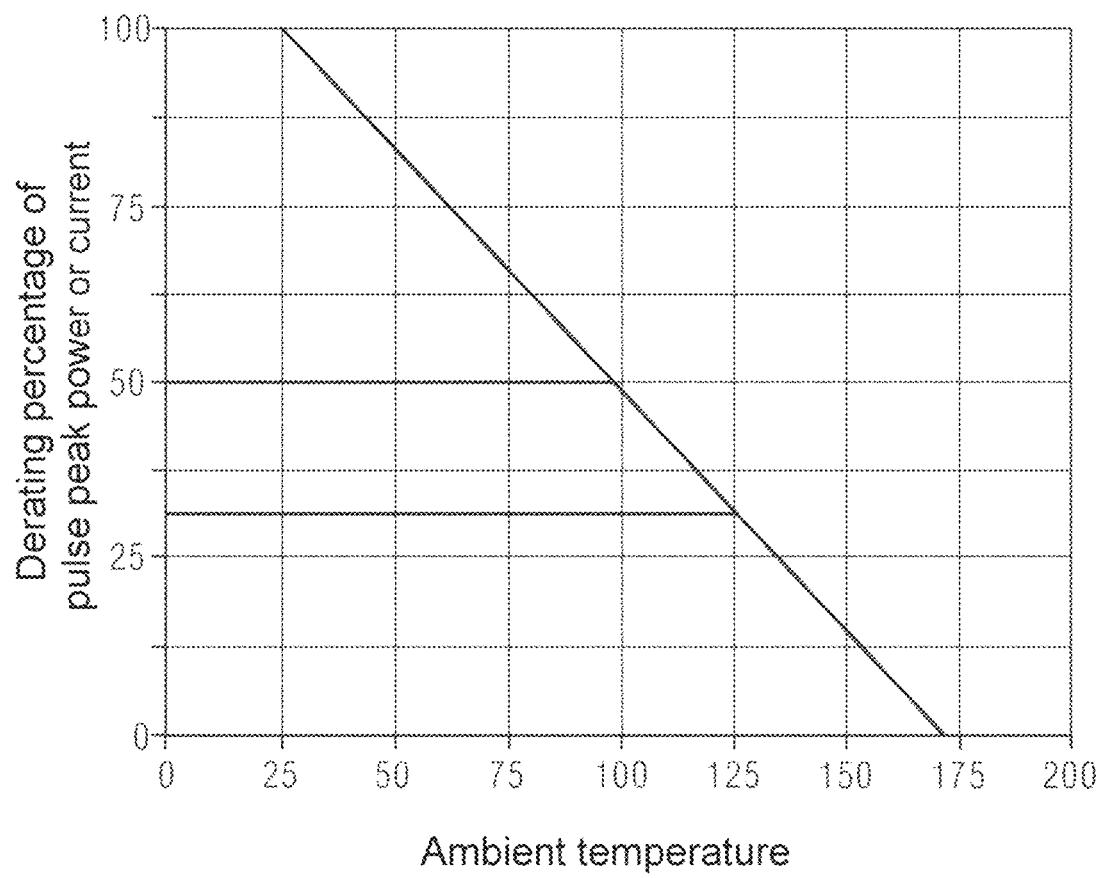
FIG. 2 is a pulse derating curve according to a particular embodiment of the present invention.

FIG. 2 is a pulse derating curve according to a particular embodiment of the present invention. The model number of the transient voltage suppression (TVS) diode in this embodiment is 5.0SMDJ SERIES. As shown in FIG. 2, the horizontal coordinate is ambient temperature, and the vertical coordinate is the derating percentage of pulse peak power or current. Based on an actual ambient temperature measured by a temperature sensor, the actual maximum current threshold is:

$$I_{threhold} = \sqrt{2 \times E_{TVS} \times \frac{(V_{clamp} - V_{bus})}{V_{clamp} \times L_{series}}}.$$

Suppose that the maximum ambient temperature that is set for the line is 100° C., and the actual ambient temperature is 25° C.; then as shown in FIG. 2, the transient voltage suppression diode will dissipate twice a predetermined value. Thus, with other factors remaining unchanged, the actual maximum current threshold will reach 1.414 times an initial value. Therefore, this will make full use of a suitable threshold, such that currents are selected more widely.

A second embodiment of the present invention provides a breaking method for a solid-state circuit breaker, wherein the solid-state circuit breaker comprises: a semiconductor switch; a control unit, connected to the semiconductor switch; and an energy absorber, connected in parallel with the semiconductor switch, wherein the control unit obtains an equivalent inductance of a circuit of the solid-state circuit breaker when a fault occurs in a line; when the equivalent inductance is greater than an inductance estimated value, the control unit sets a second current fault threshold; and when a fault current of the line reaches the second current fault threshold, the semiconductor switch is controlled to execute a closing operation.

Furthermore, the semiconductor switch is a CMOS switch, comprising a first NMOS transistor and a second NMOS transistor; the sources of the first NMOS transistor and second NMOS transistor are connected together, wherein the control unit is separately connected to the gates of the first NMOS transistor and second NMOS transistor.

Furthermore, the equivalent inductance is:

$$L_{practicalseries} = \frac{V_{bus}}{\left.\frac{di}{dt}\right|_{t=t_0}}$$

wherein $V_{bus}$ is a voltage of the line, i is a measured value of a line current, and to is the time point when the fault occurs in the line.

Furthermore, the second current fault threshold is:

$$I_{newthrehold} = \Delta T \times \frac{V_{clamp} - V_{bus}}{L_{practicalseries}}$$

wherein $V_{clamp}$ is a clamping voltage, and $\Delta T$ is a fault disappearance time.

Furthermore, an initial current fault threshold of the line is:

$$I_{oldthrehold} = \frac{V_{clamp} - V_{bus}}{L_{practicalseries}}$$

wherein $I_{newthrehold} < I_{oldthrehold}$.

Furthermore, the energy consumed by the energy absorber is:

$$E_{TVS} = \int_{t_1}^{t_2} P_{TVS}(\tau)d\tau = \frac{1}{2} \times V_{clamp} \times \Delta T$$

wherein $P_{TVS}(\tau)$ is the instantaneous power at time point $\tau$, wherein $E_{TVS} < \frac{1}{2} \times I_{oldthrehold} \times V_{clamp} \times \Delta T$.

Furthermore, the energy absorber is a transient voltage suppression diode.

At least one embodiment of the present invention can expand the range of applications of the solid-state circuit breaker, and ensure that the solid-state circuit breaker is safe and will not be burned out by a fault current. The energy that the solid-state circuit breaker needs to dissipate is controlled within a safe range through appropriate threshold arrangement. Moreover, the functions of the elements are utilized fully by taking full account of the ambient temperature.

Although the content of the present invention has already been described in detail through the preferred embodiments above, it should be recognized that the above description should not be regarded as limiting the present invention. Various amendments and substitutions for the present invention will be obvious to those skilled in the art after reading the above content. Thus, the scope of protection of the present invention should be defined by the attached claims. Moreover, no reference labels in the claims should be regarded as limiting the claims concerned; the word "comprise" does not exclude an apparatus or step that is not set out in the claims or description; and words such as "first" and "second" are only used to indicate designations, without indicating any specific order.

The invention claimed is:
1. A solid-state circuit breaker, comprising:
   a semiconductor switch;
   a controller, connected to the semiconductor switch; and
   an energy absorber, connected in parallel with the semiconductor switch,
   wherein the controller is configured to obtain an equivalent inductance of a circuit of the solid-state circuit breaker upon a fault occurring in a line,
   wherein, upon the equivalent inductance being greater than an inductance estimated value, the controller is configured to set a second current fault threshold; and
   wherein, upon a fault current of the line reaching the second current fault threshold, the semiconductor switch is controlled to execute a closing operation.

2. The solid-state circuit breaker of claim 1, wherein the semiconductor switch is a CMOS switch including,
   a first NMOS transistor and a second NMOS transistor, a source of the first NMOS transistor and a source of the second NMOS transistor being connected together,
   wherein the controller is separately connected to gates of the first NMOS transistor and the second NMOS transistor.

3. The solid-state circuit breaker of claim 2, wherein the equivalent inductance is:

$$L_{practicalseries} = \frac{V_{bus}}{\left.\frac{di}{dt}\right|_{t=t_0}}$$

wherein $V_{bus}$ is a voltage of the line, i is a measured value of a line current, and $t_0$ is the time point when the fault occurs in the line.

4. The solid-state circuit breaker of claim 3, wherein the second current fault threshold is:

$$I_{newthrehold} = \Delta T \times \frac{V_{clamp} - V_{bus}}{L_{practicalseries}}$$

wherein $V_{clamp}$ is a clamping voltage, and $\Delta T$ is a fault disappearance time.

5. The solid-state circuit breaker of claim 4, wherein an initial current fault threshold of the line is:

$$I_{oldthrehold} = \frac{V_{clamp} - V_{bus}}{L_{practicalseries}}$$

wherein $I_{newthrehold} < I_{oldthrehold}$.

6. The solid-state circuit breaker of claim 5, wherein energy consumed by the energy absorber is:

$$E_{TVS} = \int_{t_1}^{t_2} P_{TVS}(\tau)d\tau = \frac{1}{2} \times V_{clamp} \times \Delta T$$

wherein $P_{TVS}(\tau)$ is the instantaneous power at time point $\tau$, $E_{TVS} < \frac{1}{2} \times I_{oldthrehold} \times V_{clamp} \times \Delta T$.

7. The solid-state circuit breaker of claim 1, wherein the energy absorber is a transient voltage suppression diode.

8. A breaking method for a solid-state circuit breaker, the solid-state circuit breaker including a semiconductor switch, a controller, connected to the semiconductor switch, an energy absorber, connected in parallel with the semiconductor switch, the breaking method comprising:

obtaining, via the controller, an equivalent inductance of a circuit of the solid-state circuit breaker upon a fault occurring in a line;

setting, via the controller, a second current fault threshold upon the equivalent inductance being greater than an inductance estimated value; and controlling, upon a fault current of the line reaching the second current fault threshold, the semiconductor switch to execute a closing operation.

9. The breaking method for a solid-state circuit breaker of claim 8, wherein the semiconductor switch is a CMOS switch including a first NMOS transistor and a second NMOS transistor; respective sources of the first NMOS transistor and the second NMOS transistor being connected together, is the controller being separately connected to respective gates of the first NMOS transistor and the second NMOS transistor.

10. The breaking method for a solid-state circuit breaker of claim 9, wherein the equivalent inductance is:

$$L_{practicalseries} = \frac{V_{bus}}{\frac{di}{dt}\big|_{t=t_0}}$$

wherein $V_{bus}$ is a voltage of the line, i is a measured value of a line current, and $t_0$ is the time point when the fault occurs in the line.

11. The breaking method for a solid-state circuit breaker of claim 10, wherein the second current fault threshold is:

$$I_{newthrehold} = \Delta T \times \frac{V_{clamp} - V_{bus}}{L_{practicalseries}}$$

wherein $V_{clamp}$ is a clamping voltage, and $\Delta T$ is a fault disappearance time.

12. The breaking method for a solid-state circuit breaker of claim 11, wherein an initial current fault threshold of the line is:

$$I_{oldthrehold} = \frac{V_{clamp} - V_{bus}}{L_{practicalseries}}$$

wherein $I_{newthrehold} < I_{oldthrehold}$.

13. The breaking method for a solid-state circuit breaker of claim 12, wherein energy consumed by the energy absorber is:

$$E_{TVS} = \int_{t_1}^{t_2} P_{TVS}(\tau)d\tau = \frac{1}{2} \times V_{clamp} \times \Delta T$$

wherein $P_{TVS}(\tau)$ is the instantaneous power at time point $\tau$, wherein $E_{TVS} < \frac{1}{2} \times I_{oldthrehold} \times V_{clamp} \times \Delta T$.

14. The breaking method for a solid-state circuit breaker of claim 8, wherein the energy absorber is a transient voltage suppression diode.

* * * * *